(12) United States Patent
Ge et al.

(10) Patent No.: US 9,754,376 B1
(45) Date of Patent: Sep. 5, 2017

(54) METHOD AND APPARATUS FOR GENERATING A STRUCTURED LIGHT SPECKLE ENCODED PATTERN

(71) Applicants: Chenyang Ge, Shaanxi (CN); Huimin Yao, Shaanxi (CN); Yanhui Zhou, Shaanxi (CN)

(72) Inventors: Chenyang Ge, Shaanxi (CN); Huimin Yao, Shaanxi (CN); Yanhui Zhou, Shaanxi (CN)

( * ) Notice: Subject to any disclaimer, the term of this patent is extended or adjusted under 35 U.S.C. 154(b) by 0 days.

(21) Appl. No.: 15/074,049

(22) Filed: Mar. 18, 2016

(51) Int. Cl.
    *G06K 9/00* (2006.01)
    *G06T 7/00* (2017.01)

(52) U.S. Cl.
    CPC .. *G06T 7/0057* (2013.01); *G06T 2207/10028* (2013.01)

(58) Field of Classification Search
    CPC ... G06T 7/0075; G06T 7/0022; G06T 7/0057; G06T 2207/10012; G06T 2207/10028; H04N 13/0239; H04N 13/0082
    See application file for complete search history.

(56) References Cited

U.S. PATENT DOCUMENTS

| 7,773,204 B1 * | 8/2010 | Nelson ..................... G01S 13/48 356/5.02 |
| 2007/0091769 A1 * | 4/2007 | Yamakage ......... G11B 7/00772 369/103 |
| 2013/0022222 A1 * | 1/2013 | Zschau ................ G03H 1/0808 381/306 |
| 2016/0182889 A1 * | 6/2016 | Olmstead ............... H04N 19/17 348/47 |
| 2017/0054966 A1 * | 2/2017 | Zhou ................... H04N 13/0271 |

* cited by examiner

*Primary Examiner* — Amir Alavi
(74) *Attorney, Agent, or Firm* — Birch, Stewart, Kolasch & Birch, LLP (57) ABSTRACT

The present invention discloses a method of generating a structured light speckle encoded pattern, comprising: fabricating an initial speckle pattern with evenly distributed speckle particles; screening positions that all speckle particles can be disturbed to in the initial speckle pattern according to a speckle particle isolation principle; performing random disturbance to each speckle particle in the initial speckle pattern according to a generated random array and the screened positions that can be disturbed to; performing window uniqueness analysis to the disturbed speckle encoded pattern to determine whether the disturbed speckle encoded pattern meets requirements of a window uniqueness distribution. The present invention further discloses an apparatus for generating a structured light speckle encoded pattern. The present invention may generate, rapidly and accurately, a speckle encoded pattern that meets requirements of window uniqueness distribution and has good anti-noise and anti-deformation competences; besides, the generated speckle encoded pattern has a high randomness and is not restricted by pattern size.

20 Claims, 5 Drawing Sheets

METHOD AND APPARATUS FOR GENERATING A STRUCTURED LIGHT SPECKLE ENCODED PATTERN

FIELD OF THE INVENTION

The present invention relates to technical fields of computer vision, depth perception, and three-dimensional rebuilding, specifically relates to a method and apparatus for encoding a structured light that is projected in an active stereovision for marking a space, and more specifically relates to a method and apparatus for generating a structured light speckle encoded pattern.

BACKGROUND OF THE INVENTION

For humans, vision is the most direct and effective approach for mankind to perceive external environment. The purpose of studying computer vision is to expect that computers can perceive various states in the environment like human vision, such as color, shape, surface textual information of an object, environmental position of the object, motion condition of the object, and the like. Depth perception technique, as a hot issue in computer vision study and application development, plays a crucial role in fields like virtual reality, three-dimensional rebuilding, human-machine interaction, industrial automation, robot navigation, and medical imaging. For example, in the field of consumer electronics, the depth perception technology can help an electronic product to recognize different actions of human beings to thereby make corresponding reactions, which brings a brand-new experience that is more convenient and intelligent to the user and thus plays a significant role in enhancing the interaction competence and intelligent level of the electronic product. In the industrial field, sectors such as 3D printing, robot manipulation, also have urgent needs of applying high-precision and high-resolution depth information technologies.

Depth perception technologies may be divided into active types and passive types based on whether an active light source exists in a depth perception device. An active-type depth perception technology uses an image sensor to capture a pattern projected by a projector onto a spatial object; the pattern is analyzed and processed to obtain spatial position information of the object, e.g., structured light encoded manner, ToF flight time manner. The active-type depth perception technology are featured in that the depth information is stable, reliable, and less affected by ambient light, and a matching process is not affected by textual information of the object. For a structured light encoding-based depth perception method, the design of an encoded pattern projector is the essential part, and the designed encoded pattern will directly affect the computational complexity of depth decoding, as well as the precision and resolution of the depth information.

SUMMARY OF THE INVENTION

Due to the above drawbacks in the prior art, the present invention provides a method of generating a structured light speckle encoded pattern, comprising:

Step 1: fabricating an initial speckle pattern with evenly distributed speckle particles;

Step 2: screening positions that all speckle particles can be disturbed to in the initial speckle pattern according to a speckle particle isolation principle;

Step 3: performing random disturbance to each speckle particle in the initial speckle pattern according to a generated random array and the screened movable positions;

Step 4: performing window uniqueness analysis to the disturbed speckle encoded pattern to determine whether the disturbed speckle encoded pattern meets requirements of a window uniqueness distribution.

Wherein, if the disturbed speckle encoded pattern meets the requirements of the window uniqueness distribution, a final speckle encoded pattern is generated; if the disturbed speckle encoded pattern fails to meet the requirements of the window uniqueness distribution, steps 2-4 are repeated for the disturbed speckle encoded pattern so as to further adjust random distribution of the speckle particles.

Wherein, the step 1 comprises: first designing primitive patterns of a certain size, and then arranging the primitive patterns along horizontal and vertical directions, to form an initial speckle pattern with a certain resolution size.

Wherein, in designing of primitive patterns, each of the speckle particles is isolated and can be disturbed.

Wherein, the speckle particle isolation principle means one speckle particle is neither connected to nor overlapped with other speckle particles.

Wherein, the screening comprises screening according to a neighborhood method or screening with a unit of speckle pixel group.

Wherein, the screening according to the neighborhood method comprises: extracting an image block, screening eight neighborhood positions of a central speckle particle according to a first screening principle; the first screening principle is: for each position of the eight neighborhoods, if no speckle particles other than the central speckle particle exist in the eight neighborhoods of the position, then the position is a position that the speckle particle can be disturbed to, i.e., the position that can be disturbed to has to ensure that the disturbed speckle particle still maintains an isolated state; otherwise, the position is a position that the speckle particle cannot be disturbed to.

Wherein, the screening with a unit of speckle pixel group comprises: first defining a speckle pixel group by selecting, within a speckle particle and its eight neighborhoods, four pixels that include the speckle particle and are adjacent with one another, as a speckle pixel group; during the screening process, first, marking pixels of all speckle pixel groups in the speckle pattern, and then screening the eight neighborhood positions of the speckle particle according to a second screening principle.

Wherein, the second screening principle performs determination with a unit of speckle pixel group. The second screening principle is specifically that a certain position in the eight neighborhoods is supposed to be a speckle particle, which is used as an apex to form a speckle pixel group; then, it is determined whether pixels of other speckle pixel groups than a central speckle pixel group exist in the pixel group; in the case of not existing, the position is a position that can be disturbed to; otherwise, a position that cannot be disturbed to.

Wherein, one or more groups of random arrays of a same number as the number of speckle particles in the initial speckle pattern are generated according to a disturbing method.

The present invention further provides an apparatus for generating a structured light speckle encoded pattern, comprising:

a fabricating module configured to fabricate an initial speckle pattern with evenly distributed speckle particles;

a screening module configured to screen positions that all speckle particles can be disturbed to in the initial speckle pattern according to a speckle particle isolation principle;

a disturbing module configured to perform random disturbance to each speckle particle in the initial speckle pattern according to a generated random array and the screened positions that can be disturbed to;

a determining module configured to perform window uniqueness analysis to the disturbed speckle encoded pattern to determine whether the disturbed speckle encoded pattern meets requirements of a window uniqueness distribution.

Wherein, the apparatus further comprises: a speckle encoded pattern generating module configured to, if it is determined that the disturbed speckle encoded pattern meets the requirements of the window uniqueness distribution, generate a final speckle encoded pattern.

Wherein, the fabricating module is further configured to: first, design primitive patterns of a certain size, and then arrange the primitive patterns along horizontal and vertical directions, to form an initial speckle pattern with a certain resolution size.

Wherein, in designing of primitive patterns, each of the speckle particles is isolated and can be disturbed.

Wherein, the speckle particle isolation principle means one speckle particle is neither connected to nor overlapped with other speckle particles.

Wherein, the screening comprises screening according to a neighborhood method or screening with a unit of speckle pixel group.

Wherein, the screening according to the neighborhood method comprises: extracting an image block, screening eight neighborhood positions of a central speckle particle according to a first screening principle; the first screening principle is: if no speckle particles other than the central speckle particle exist in the eight neighborhoods at a position, then the position is a position that can be disturbed to, i.e., the position that can be disturbed to has to ensure that the disturbed speckle particle still maintains an isolated state; otherwise, the position is a position that cannot be disturbed to.

Wherein, the screening with a unit of speckle pixel group comprises: first, defining a speckle pixel group by selecting, within a speckle particle and its eight neighborhoods, four pixels that include the speckle particle and are adjacent with one another, as a speckle pixel group; during the screening process, first, marking pixels of all speckle pixel groups in the speckle pattern, and then screening the eight neighborhood positions of the speckle particle according to a second screening principle.

Wherein, the second screening principle performs determination with a unit of speckle pixel group. The second screening principle is specifically that a certain position in the eight neighborhoods is supposed to be a speckle particle, which is used as an apex to form a speckle pixel group; then, it is determined whether pixels of other speckle pixel groups than a central speckle pixel group exist in the pixel group; in the case of not existing, the position is a position that can be disturbed to; otherwise, a position that cannot be disturbed to.

Wherein, the apparatus further comprises a random array generating module configured to generate one or more random arrays of a same number as the number of speckle particles in the initial speckle pattern according to a disturbing method. Then the random arrays will be used to disturb the speckle particles.

The present invention may generate, rapidly and accurately, a speckle encoded pattern that meets requirements of the window uniqueness distribution, and has a good randomness feature. Besides, it meets a window unique discernibility characteristic of the structured light encoded pattern, i.e., when the encoded pattern is projected by a projector onto a physical space or a target object, each speckle particle point on the projected space or the surface of the target object can be uniquely discerned, which resolves issues of feature marking and match discerning. The method provided by the present invention has certain robustness, including anti-noise and anti-deformation competences; besides, the generated speckle encoded pattern has a high randomness and is not restricted by pattern size.

DETAILED DESCRIPTION OF THE PREFERRED EMBODIMENTS

Hereinafter, the present invention will be described in further detail with reference to the accompanying drawings.

Figure 1:
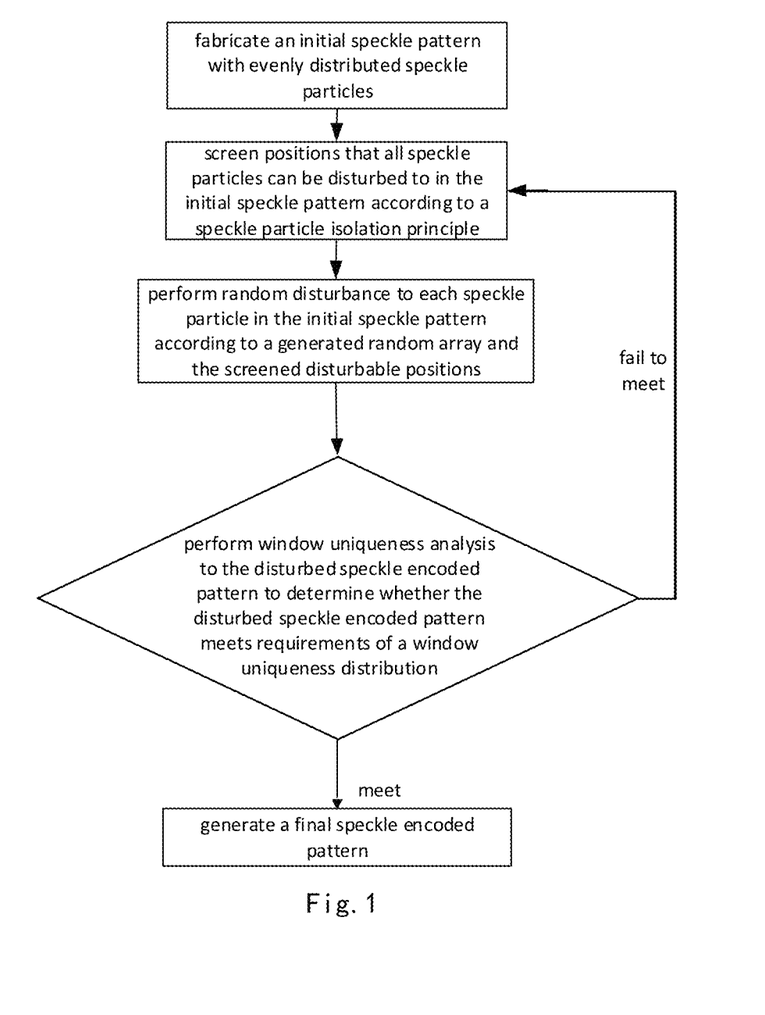
FIG. 1 shows an overall flow diagram of generating a structured light speckle encoded pattern according to the present invention.

FIG. 1 shows an overall flow diagram of generating a structured light speckle encoded pattern according to the present invention.

Step 1: fabricate an initial speckle pattern with evenly distributed speckle particles.

First, design out primitive patterns of a certain size, then arrange the primitive patterns along horizontal and vertical directions, to form an initial speckle pattern of a certain resolution size.

In designing the primitive patterns, it is required that each speckle particle (22) is isolated, which means no other speckle particles exist in eight neighborhoods of that speckle particle and the speckle particle can be disturbed. That is, a position that the speckle particle can be disturbed to exists in the eight neighborhoods of the speckle particle. Because a distribution density of the speckle particle in the generated speckle encoded pattern is determined by primitive patterns, proper primitive patterns may be designed according to the needs. As shown in FIG. 2, FIG. 2(a), FIG. 2(b), FIG. 2(c), and FIG. 2(d) are four kinds of primitive patterns with different densities presented in the present invention, with black patches indicating the speckle particles (22), wherein no positions that can be disturbed to exist in the eight neighborhoods of all speckle particles in the initial speckle pattern designed in FIG. 2(d); therefore, FIG. 2(d) is not used as a primitive pattern for constructing an initial speckle pattern in the present invention.

The initial speckle pattern may arrange M(M=1, 2, 3 . . . m) primitive patterns in the horizontal direction and arranging N(N=1, 2, 3 . . . n) primitive patterns in a vertical direction based on design requirements, where m, n are all positive integers, thereby forming a speckle pattern of a certain resolution size (M×N).

FIGS. 2(a), 2(b), 2(c), and 2(d) of the present invention are only embodiments for exhibiting primitive patterns of four different densities of the present invention; other similar primitive patterns also fall within the protection scope of the present invention.

Step 2: screen positions that all speckle particles can be disturbed to in the initial speckle pattern according to a speckle particle isolation principle.

Specifically, the speckle particle isolation principle means one speckle particle is neither connected to nor overlapped with other speckle particles. The screening process mainly screens positions of eight neighborhoods of each speckle particle in the initial speckle pattern.

Figure 3A:
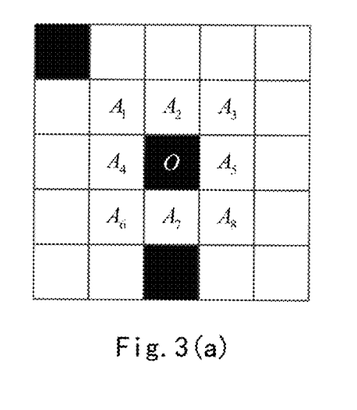
FIG. 3(a) shows a schematic diagram of an embodiment of screening positions that a speckle particle can be disturbed to according to the present invention.
Figure 3B:
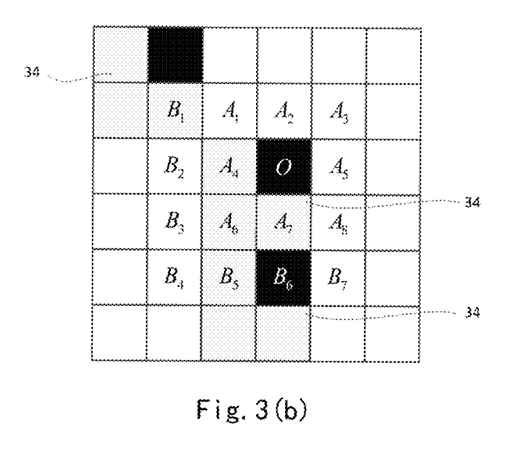
FIG. 3(b) shows a schematic diagram of another embodiment of screening movable positions of a speckle particle according to the present invention.

With reference to FIGS. 3(a) and 3(b), the present invention provides two kinds of embodiments of screening positions that speckle particles can be disturbed to. FIG. 3(a) shows an embodiment of screening according to a neighborhood method, where a 5×5 image block is extracted with a 1×1 speckle particle as a center in the speckle pattern, and screening is performed to eight neighborhood positions of the central speckle particle according to a first screening principle. The first screening principle is: if no speckle particles other than the central speckle particle exist in the eight neighborhoods at the position, then the position is a position which the speckle particle can be disturbed to, i.e., the position that can be disturbed to has to ensure that the disturbed speckle particle still maintains an isolated state; otherwise, the position is a position that the speckle particle cannot be disturbed to. As shown in FIG. 3(a), with the speckle particle at position O as an example, the eight neighborhoods of the point are eight points from $A_1$ to $A_8$, which eight points are screened in succession; for example, speckle A particles other than point O exist in eight neighborhoods of $A_1$, such that point $A_1$ is a position to which the speckle particle O cannot be disturbed; while no speckle particles other than point O exist in eight neighborhoods of $A_2$, such that the speckle particle O can be disturbed to position $A_2$, and so on; in the eight neighborhoods of point O, $A_2$, $A_3$, $A_4$ and $A_5$ are positions that can be disturbed to, while $A_1$, $A_6$, $A_7$ and $A_8$ are positions that cannot be disturbed to.

In another embodiment, FIG. 3(b) provides a method of screening with a unit of speckle pixel group. First, the speckle pixel group is defined as such: selecting, within a speckle particle and its eight neighborhoods, four pixels, including the speckle particle, each two of them being adjacent, as a speckle pixel group. As shown in FIG. 3(b), pixels O, $A_4$, $A_6$ and $A_7$ form a speckle pixel group 34 with the speckle particle O as an apex. During the screening process, first, pixels of all speckle pixel groups in the speckle pattern are marked, and then screening is made to the eight neighborhood positions of the speckle particle according to a second screening principle. The second screening principle performs determination with a unit of the speckle pixel group. This screening principle is specifically described as such: a certain position in the eight neighborhoods is supposed to be a speckle particle, which is used as an apex to form a speckle pixel group; then, it is determined whether pixels of other speckle pixel groups than a central speckle pixel group exist in the pixel group; in the case of not existing, the position is a position that the speckle particle can be disturbed to; otherwise, a position that the speckle particle cannot be disturbed to. With position $A_1$ as an example, pixels $B_1$, $B_2$, $A_1$ and $A_4$ form a pixel group with $A_1$ as an apex. Because this pixel group includes pixels of other speckle pixel group than speckle O, $A_1$ is the position that cannot be disturbed to; while the pixel group with pixel $A_2$ as the apex does not include pixels of other speckle pixel groups, such that is a position that can be disturbed to; and so on. $A_2$, $A_3$, $A_4$ and $A_5$ are positions that can be disturbed to in the eight neighborhoods of point O, while $A_1$, $A_6$, $A_7$ and $A_8$ are positions that cannot be disturbed to.

One embodiment of the present invention is screening positions that can be disturbed to with respect to eight neighborhoods of a speckle particle. Disturbance in a larger neighborhood range surrounding the speckle particle also falls within the protection scope of the present invention.

Step 3: perform random disturbance to each speckle particle in the initial speckle pattern according to a generated random array and the positions that can be disturbed as screened in step 2, wherein one or more groups of random arrays with a same number as the number of speckle particles of the initial speckle pattern are generated according to a disturbing method.

In the present invention, generation of the random arrays employs a random array generating function embedded in programming software, but the present invention is not limited to the function; any function may be employed as long as certain randomness is satisfied. The generated random array needs to be adjusted according to a disturbing method. For example, when performing random disturbance within the screened eight neighborhoods of the speckle particle provided by the embodiment in step 2, disturbance may be performed by randomly adding a displacement to the horizontal and vertical directions of the speckle particle; if a disturbed position (including the original position) is a position that can be disturbed to, disturbance may be performed by adding a displacement to the speckle particle; if it is an position that cannot be disturbed to, the speckle particle remains at the original position. This disturbing method needs to generate two groups of three-element random arrays with the same number of speckle particles as the initial speckle pattern (i.e., the random arrays only contain three elements: −1, 0, 1), for adding displacement to the corresponding speckle particle in the vertical and horizontal directions. In addition, disturbance may also be performed by randomly selecting a position among the eight neighborhood positions and the original position of the speckle particle to move; likewise, if the disturbed position is a position that can be disturbed to, the speckle is moved to that position; if it is a position that cannot be disturbed to, the speckle particle remains at the original position. This disturbing method needs to generate a nine-element random array with the same number of speckle particles as the initial speckle pattern (i.e., the random array only contains 9 elements: 1, 2, 3, 4, 5, 6, 7, 8), so as to randomly select a position from among the eight neighborhood positions and the original position of the corresponding speckle particle.

Step 4: perform window uniqueness analysis to the disturbed speckle encoded pattern in step 3 to determine whether the disturbed speckle encoded pattern meets requirements of a window uniqueness distribution. If the disturbed speckle encoded pattern meets the requirements of the window uniqueness distribution, a final speckle encoded pattern is generated; if the disturbed speckle encoded pattern fails to meet the requirements of the window uniqueness distribution, steps 2-4 are repeated for the disturbed speckle encoded pattern so as to further adjust random distribution of the speckle particles.

In the structured light encoded depth perception technology, the structured light encoded pattern has to satisfy window uniqueness: within a certain search range (r×v) of the structured light encoded pattern (wherein r, v are positive integers), an encoded pattern block formed by all k1×k2 submatrices only appear once, i.e., the pattern block is unique so as to be distinguished from other encoded patterns of the same size.

The size of the window is just the size of the encoded pattern block (k1×k2), wherein the values of k1, k2 are positive integers. The present invention has no limitation on the size of the encoded pattern block, i.e., the size of the encoded pattern block is adjustable. The larger the window is, the easier the uniqueness is satisfied; the smaller the window is, the better the details of a depth image as obtained are in actual applications.

Figure 2A:
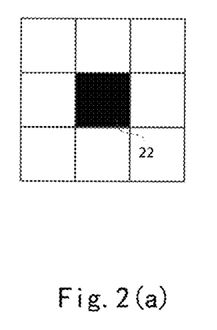
FIG. 2(a) shows an embodiment design of primitive patterns in an initial speckle pattern according to the present invention.
Figure 2B:
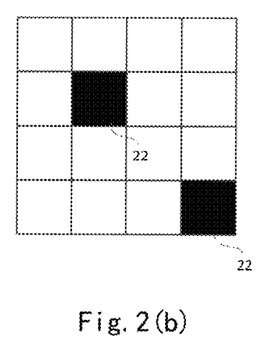
FIG. 2(b) shows another embodiment design of primitive patterns in an initial speckle pattern according to the present invention.
Figure 2C:
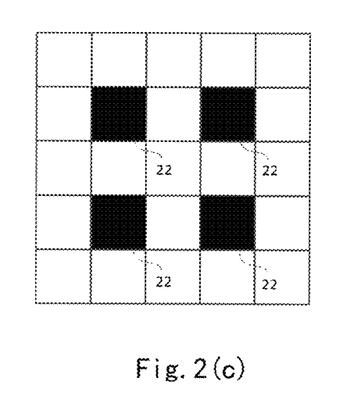
FIG. 2(c) shows a further embodiment design of primitive patterns in an initial speckle pattern according to the present invention.
Figure 2D:
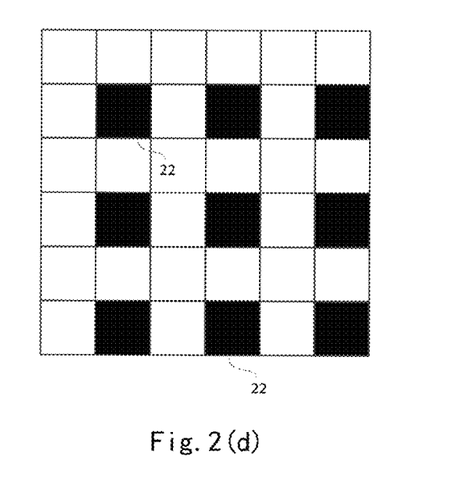
FIG. 2(d) shows a still further embodiment design of primitive patterns in an initial speckle pattern according to the present invention.
Figure 4A:
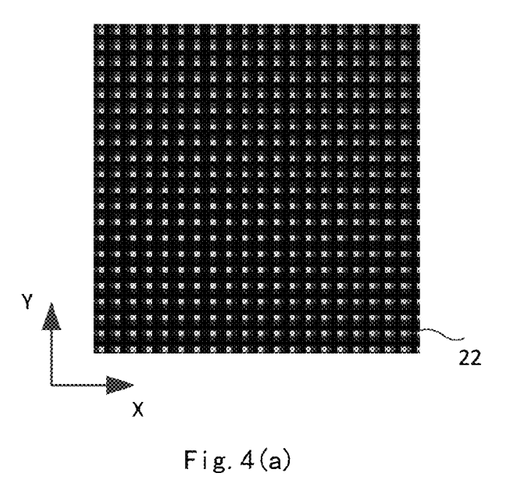
FIG. 4(a) shows an initial speckle pattern generated according to the primitive patterns in FIG. 2(a)
Figure 4B:
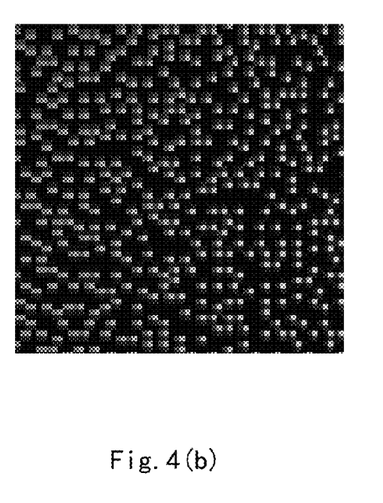
FIG. 4(b) shows a speckle encoded image of FIG. 4(a) after being disturbed once.

The primitive patterns of FIG. 2(a) are taken as an example to analyze the randomness of the speckle particles in FIG. 4. FIG. 4(a) shows an initial speckle pattern consisting of 21×21 primitive patterns with a resolution of 63×63. With a submatrix consisting of 3×3 primitive patterns in FIG. 2(a), the submatrix is a 9×9 encoded pattern block. In the initial speckle pattern, the encoded pattern block has 9 speckle particles inside, and each speckle particle may have 9 positions that can be disturbed to. After random disturbance, there are theoretically $9^9$ (397,420,489) kinds of arrangements of the speckle particles in the encoded pattern block, i.e., may generate $9^9$ kinds of different encoded pattern blocks, thereby guaranteeing that all encoded patterns in the whole structured light encoded pattern are distinguished, thereby satisfying the window uniqueness requirement of the structured light encoded pattern. In actuality, in order to satisfy the isolation principle of the speckle particles in the entire structured light encoded pattern, the positions that the speckle particles can be disturbed to decrease somewhat, i.e., cannot read $9^9$ different kinds of encoded pattern blocks; but the remaining number is still very huge, which are sufficient to distinguish all encoded pattern blocks in the entire structured light encoded pattern. FIG. 4(a) is a primary speckle pattern generated based on the primitive patterns of FIG. 2(a); FIG. 4(b) is a speckle encoded pattern of FIG. 4(a) after being disturbed once; in FIG. 4(b), each 9×9 encoded pattern block is unique in the entire structured light encoded pattern.

Preferably, the present invention may also increase the size or disturbance times of the submatrix (encoded pattern block) so as to enhance the randomness of the structured light encoded pattern, i.e., increasing the kinds of arrangements of the speckle particles in the submatrix (i.e., encoded pattern block), so as to better meet the window uniqueness requirements. Through the above steps, a structured light encoded speckle pattern satisfying requirements of window uniqueness distribution of a certain size can be obtained.

Figure 5:
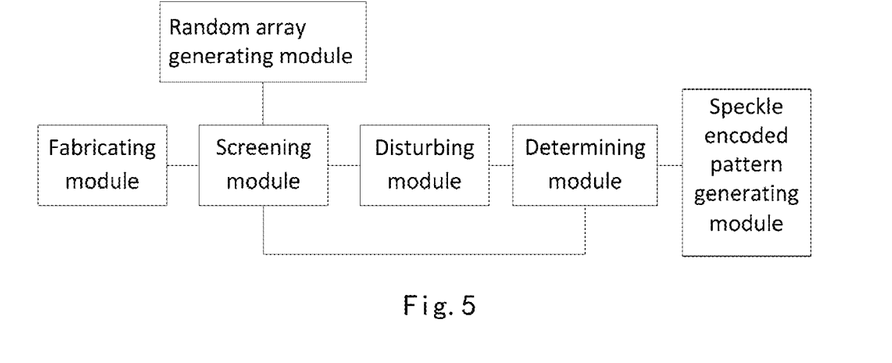
FIG. 5 shows a schematic diagram of an apparatus for generating a structured light speckle encoded pattern according to the present invention.

FIG. 5 shows a schematic diagram of an apparatus for generating a structured light speckle encoded pattern according to the present invention. The generating apparatus is for executing the generating method of the present invention as described above. As shown in FIG. 5, the apparatus comprises: a fabricating module, a screening module, a disturbing module, and a determining module.

The fabricating module is configured to fabricate an initial speckle pattern with evenly distributed speckle particles. Moreover, the fabricating module is further configured to: first design primitive patterns of a certain size, and then arrange the primitive patterns along horizontal and vertical directions, to form an initial speckle pattern with a certain resolution size. In designing of primitive patterns, each of the speckle particles is isolated and can be disturbed.

The screening module is configured to screen positions that all speckle particles can be disturbed to in the initial speckle pattern according to a speckle particle isolation principle. The speckle particle isolation principle means one speckle particle is neither connected to nor overlapped with other speckle particles. The screening comprises screening according to a neighborhood method or screening with a unit of speckle pixel group.

The screening according to the neighborhood method comprises: extracting an image block, screening eight neighborhood positions of a central speckle particle according to a first screening principle; the first screening principle is: if no speckle particles other than the central speckle particle exist in the eight neighborhoods at a position, then the position is a movable position, i.e., the position that can be disturbed to has to ensure that the disturbed speckle particle still maintains an isolated state; otherwise, the position is a position that cannot be disturbed to.

The screening with a unit of speckle pixel group comprises: first defining a speckle pixel group by selecting, within a speckle particle and its eight neighborhoods, four pixels, including the speckle particle and each two of them being adjacent, as a speckle pixel group; during the screening process, first marking pixels of all speckle pixel groups in the speckle pattern, and then screening the eight neighborhood positions of the speckle particle according to a second screening principle.

The second screening principle performs determination with a unit of speckle pixel group. The second screening principle is specifically that a certain position in the eight neighborhoods is supposed to be a speckle particle, which is used as an apex to form a speckle pixel group; then, it is determined whether pixels of other speckle pixel groups than a central speckle pixel group exist in the pixel group; in the case of not existing, the position is a position that can be disturbed to; otherwise, a position that cannot be disturbed to.

The disturbing module is configured to perform random disturbance to each speckle particle in the initial speckle pattern according to a generated random array and the screened positions that can be disturbed to.

The determining module is configured to perform window uniqueness analysis to the disturbed speckle encoded pattern to determine whether the disturbed speckle encoded pattern meets requirements of a window uniqueness distribution.

The generating apparatus further comprises: a speckle encoded pattern generating module configured to, if it is determined that the disturbed speckle encoded pattern meets the requirements of the window uniqueness distribution, generate a final speckle encoded pattern. If the disturbed speckle encoded pattern fails to meet the requirements of the window uniqueness distribution, the disturbed speckle encoded pattern is returned to the screening module, such that the screening module, the disturbing module, and the determining module repeat the screening, disturbing and determining operations, for further adjusting randomness distribution of the speckle particles.

The generating apparatus further comprises a random array generating module configured to generate one or more random arrays of a same number as the number of speckle particles in the initial speckle pattern according to a disturbing method. Then the random arrays will be used to disturb the speckle particles.

The structured light speckle encoded pattern generated according to the method and apparatus of the present invention may be projected onto a physical space and a surface of a target object through a projecting device, thereby implementing feature marking to the projection space and the target object, which facilitates image recognition. The projected speckle particle is not limited to a dot form. The projecting device is not limited to a laser speckle projector, an LED/LCD projector, a DLP, which also includes other fixed or dynamic projecting devices. The supported light wave of the projected pattern includes light waves of various wavelengths, e.g., X-ray, UV ray, visible light, infrared light, etc.

The present invention is not limited the preferred embodiments above. Therefore, modifications and perfections without departing from the spirit and scope of the present invention should be included within the scope of the appended claims.

The invention claimed is:

1. A method of generating a structured light speckle encoded pattern, comprising:
   Step 1: fabricating an initial speckle pattern with evenly distributed speckle particles;
   Step 2: screening positions that all speckle particles can be disturbed to in the initial speckle pattern according to a speckle particle isolation principle;
   Step 3: performing random disturbance to each speckle particle in the initial speckle pattern according to a generated random array and the screened positions that can be disturbed to;
   Step 4: performing window uniqueness analysis to the disturbed speckle encoded pattern to determine whether the disturbed speckle encoded pattern meets requirements of a window uniqueness distribution.

2. The method according to claim 1, wherein the method further comprises: if the disturbed speckle encoded pattern meets the requirements of the window uniqueness distribution, generating a final speckle encoded pattern; if the disturbed speckle encoded pattern fails to meet the requirements of a window uniqueness distribution, repeating steps 2-4 with respect to the disturbed speckle encoded pattern, for further adjusting random distribution of the speckle particles.

3. The method according to claim 1, wherein the step 1 comprises:
   first designing primitive patterns of a certain size, and then arranging the primitive patterns along horizontal and vertical directions, to form an initial speckle pattern with a certain resolution size.

4. The method according to claim 3, wherein in designing of primitive patterns, each of the speckle particles is isolated and can be disturbed.

5. The method according to claim 1, wherein the speckle particle isolation principle means the speckle particle is neither connected to nor overlapped with other speckle particles.

6. The method according to claim 1, wherein the screening comprises screening according to a neighborhood method or screening with a unit of speckle pixel group.

7. The method according to claim 6, wherein the screening according to the neighborhood method comprises: extracting an image block, screening eight neighborhood positions of a central speckle particle according to a first screening principle; the first screening principle is: if no speckle particles other than the central speckle particle exist in the eight neighborhoods at a position, then the position is a position that the speckle particle can be disturbed to, i.e., the position that can be disturbed to has to ensure that the disturbed speckle particle still maintains an isolated state; otherwise, the position is a position which the speckle particle cannot be disturbed to.

8. The method according to claim 6, wherein the screening with a unit of speckle pixel group comprises:
   first defining a speckle pixel group by selecting, within a speckle particle and its eight neighborhoods, four pixels, including the speckle particle and each two of them being adjacent, as a speckle pixel group;
   during the screening process, first marking pixels of all speckle pixel groups in the speckle pattern, and then screening the eight neighborhood positions of the speckle particle according to a second screening principle.

9. The method according to claim 8, wherein the second screening principle performs determination with a unit of speckle pixel group; the second screening principle is specifically that a certain position in the eight neighborhoods is supposed to be a speckle particle, which is used as an apex to form a speckle pixel group; then, it is determined whether pixels of other speckle pixel groups than a central speckle pixel group exist in the pixel group; in the case of not existing, the position is a position that can be moved to; otherwise, a position that cannot be disturbed to.

10. The method according to claim 1, wherein one or more groups of random arrays of a same number as the number of speckle particles in the initial speckle pattern are generated according to a disturbing method.

11. An apparatus for generating a structured light speckle-encoded pattern, comprising:
    a fabricating module configured to fabricate an initial speckle pattern with evenly distributed speckle particles;
    a screening module configured to screen positions that all speckle particles can be disturbed to in the initial speckle pattern according to a speckle particle isolation principle;
    a disturbing module configured to perform random disturbance to each speckle particle in the initial speckle pattern according to a generated random array and the screened positions that can be disturbed to;
    a determining module configured to perform window uniqueness analysis to the disturbed speckle encoded pattern to determine whether the disturbed speckle encoded pattern meets requirements of a window uniqueness distribution.

12. The apparatus according to claim 11, further comprising:
    a speckle-encoded pattern generating module configured to, if it is determined that the disturbed speckle encoded pattern meets the requirements of the window uniqueness distribution, generate a final speckle encoded pattern.

13. The apparatus according to claim 11, wherein the fabricating module is further configured to:
    first design primitive patterns of a certain size, and then arrange the primitive patterns along horizontal and vertical directions, to form an initial speckle pattern with a certain resolution size.

14. The apparatus according to claim 13, wherein in designing of primitive patterns, each of the speckle particles is isolated and can be disturbed.

15. The apparatus according to claim 11, wherein the speckle particle isolation principle means one speckle particle is neither connected to nor overlapped with other speckle particles.

16. The apparatus according to claim 11, wherein the screening comprises screening according to a neighborhood method or screening with a unit of speckle pixel group.

17. The apparatus according to claim 16, wherein the screening according to the neighborhood method comprises: extracting an image block, screening eight neighborhood positions of a central speckle particle according to a first screening principle; the first screening principle is: if no speckle particles other than the central speckle particle exist in the eight neighborhoods at a position, then the position is a position that can be disturbed to, i.e., the position that can be disturbed to has to ensure that the disturbed speckle particle still maintains an isolated state; otherwise, the position is a position that cannot be disturbed to.

18. The apparatus according to claim 16, wherein the screening with a unit of speckle pixel group comprises:

first defining a speckle pixel group by selecting, within the speckle particle and its eight neighborhoods, four pixels, including the speckle particle and each two of them being adjacent, as a speckle pixel group;

during the screening process, first marking pixels of all speckle pixel groups in the speckle pattern, and then screening the eight neighborhood positions of the speckle particle according to a second screening principle.

19. The apparatus according to claim 18, wherein the second screening principle performs determination with a unit of speckle pixel group; the second screening principle is specifically that a certain position in the eight neighborhoods is supposed to be a speckle particle, which is used as an apex to form a speckle pixel group; then, it is determined whether pixels of other speckle pixel groups than a central speckle pixel group exist in the pixel group; in the case of not existing, the position is a position that can be disturbed to; otherwise, a position that cannot be disturbed to.

20. The apparatus according to claim 11, wherein the apparatus further comprises:

a random array generating module configured to generate one or more groups of random arrays of a same number as the number of speckle particles in the initial speckle pattern according to a disturbing method.

* * * * *